US007978668B2

(12) United States Patent
Wang et al.

(10) Patent No.: US 7,978,668 B2
(45) Date of Patent: Jul. 12, 2011

(54) APPARATUS, METHOD, AND COMPUTER READABLE MEDIUM THEREOF FOR SIMULTANEOUSLY ESTABLISHING LINKS WITH A PLURALITY OF NODES

(75) Inventors: Shie-Yuan Wang, Hsinchu (TW); Frank Chee-Da Tsai, Taipei (TW); Hsu-Heng Weng, Taipei (TW); Chih-Che Lin, Chung-He (TW); Ku-Han Fan, Chung-He (TW); Teng-Wei Hsu, Taichung (TW)

(73) Assignee: Institute for Information Industry, Taipei (TW)

( * ) Notice: Subject to any disclaimer, the term of this patent is extended or adjusted under 35 U.S.C. 154(b) by 339 days.

(21) Appl. No.: 11/683,520

(22) Filed: Mar. 8, 2007

(65) Prior Publication Data

US 2008/0137623 A1    Jun. 12, 2008

(30) Foreign Application Priority Data

Dec. 7, 2006    (TW) ............................... 95145691 A

(51) Int. Cl.
*H04W 4/00*    (2009.01)

(52) U.S. Cl. ........ 370/338; 370/254; 370/329; 370/330; 370/335; 370/336; 370/337; 370/390; 370/406; 370/431; 370/432; 370/436; 709/227; 709/228

(58) Field of Classification Search ................. 370/254, 370/338, 329, 330, 335–337, 390, 406, 431, 370/432, 436; 709/227–228
See application file for complete search history.

(56) References Cited

U.S. PATENT DOCUMENTS

| | | | |
|---|---|---|---|
| 6,775,259 B1 * | 8/2004 | Ranta | 370/341 |
| 6,775,295 B1 * | 8/2004 | Lothberg et al. | 370/465 |
| 7,181,214 B1 * | 2/2007 | White | 455/435.1 |
| 7,286,489 B2 * | 10/2007 | Ades | 370/254 |
| 7,299,062 B2 * | 11/2007 | Yi et al. | 455/511 |
| 7,483,413 B2 * | 1/2009 | Strutt et al. | 370/338 |
| 7,570,600 B1 * | 8/2009 | Slaughter et al. | 370/254 |
| 2004/0203787 A1 * | 10/2004 | Naghian | 455/437 |

(Continued)

OTHER PUBLICATIONS

Interference-Aware IEEE 802.16 WiMax Mesh Networks Hung-Yu Wei, Samrat Ganguly, Rauf Izmailov, Broadband & Mobile Networking Department, NEC Laboratories America Princeton, New Jersey, USA. Zygmunt J. Haas, School of Electrical and Computer Engineering, Cornell University Ithaca, New York, USA.*

*Primary Examiner* — Hong Cho
*Assistant Examiner* — Ajay P Cattungal
(74) *Attorney, Agent, or Firm* — Patterson Thuente Christensen Pederson, P.A.

(57) ABSTRACT

An apparatus, method, and computer readable medium thereof for simultaneously establishing links with a plurality of nodes in a wireless network are provided. A processing module determines whether a mesh network configuration message of the apparatus has space to packet an information element and determines whether to transmit a Neighbor Link Establishment information element to one of the nodes. If the mesh network configuration message has space to packet an information element and the Neighbor Link Establishment information element needs to be transmitted to one of the nodes, the Neighbor Link Establishment information element will be packeted into the mesh network configuration message. Finally, a transmission module transmits the mesh network configuration message to the nodes in order to solve the problem of increasing time during link establishment and avoid deadlock among the nodes when the apparatus of the prior art establishes links with the nodes simultaneously.

9 Claims, 4 Drawing Sheets

U.S. PATENT DOCUMENTS

| | | | |
|---|---|---|---|
| 2005/0232212 A1* | 10/2005 | Kang et al. | 370/338 |
| 2006/0148483 A1* | 7/2006 | Howard et al. | 455/450 |
| 2006/0268879 A1* | 11/2006 | Xhafa et al. | 370/392 |
| 2007/0162751 A1* | 7/2007 | Braskich et al. | 713/169 |
| 2008/0016350 A1* | 1/2008 | Braskich et al. | 713/169 |
| 2008/0253340 A1* | 10/2008 | Hirano et al. | 370/338 |

* cited by examiner

APPARATUS, METHOD, AND COMPUTER READABLE MEDIUM THEREOF FOR SIMULTANEOUSLY ESTABLISHING LINKS WITH A PLURALITY OF NODES This application claims the benefit of priority based on Taiwan Patent Application No. 095145691 filed on Dec. 7, 2006 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to an apparatus, and a method for simultaneously establishing links with a plurality of nodes in a wireless network. The method can be implemented by a computer program which is stored in a computer readable medium.

2. Descriptions of the Related Art

With the rapid development of the computer network, various broadband services are now essential to the information industry. However, only part of computer users in the whole world can use high speed wired broadband services, such as the digital subscribe line (DSL) and the cable broadband access. From network telecommunication service providers' point of view, they desire to expand the coverage range of the broadband network. However, the related infrastructure costs for building the wired network make the providers move back. Broadband wireless techniques, hence, become an important solution. In light of communication distance, the current techniques of the wireless network can be classified into the wide area network (WAN), the metropolitan area network (MAN), the local area network (LAN), and the personal area network (PAN).

IEEE 802.16, worldwide interoperability for microwave access (WiMax), is a newly developing wireless transmission standard. The original establishing objective is to set up a radio standard of the metropolitan network to provide a wireless broadband connection technique of "the last mile" for the telecommunication industry. After continuously improved by the researchers of IEEE 802.16, more market requests can be supported now, such as various mobile and high speed broadband applications. Furthermore, comparing with IEEE 802.11, i.e., Wi-Fi and the third generation mobile communication (3G) technique, IEEE 802.16 has the advantages of larger network bandwidth, lower construction cost, better service quality, better expansibility, and extending the usage mode of a Wi-Fi hot spot.

IEEE 802.16 defines two operation modes. One is the point to multipoint (PMP) mode which is used in the aforementioned wireless broadband connection technique of "the last mile" to replace the conventional fixed network, such as the asymmetric digital subscriber line (ADSL) or the T1 subscriber line. The other operation mode is the mesh mode which provides a high speed and reliable backbone network. After several years' research on the PMP mode, the current techniques are very mature and already applied widely. Although the mesh mode has many advantages, it involves a more complicated technique and does not mature yet. Hence, the mesh mode still requires a lot of development.

As shown in FIG. 1, a conventional wireless network 1 operating under the mesh operation mode of IEEE 802.16 is disclosed. The wireless network 1 comprises a base station 101, a plurality of nodes 103, 105, . . . , 113 and an apparatus 115 which is about to join the wireless network 1. The base station 101 establishes the wireless network 1. The nodes 103, 105, . . . , 113 are various kinds of communication apparatuses for transmitting and routing data. The apparatus 115 has an effective connection range 100 which covers the nodes 107, 111, 113, and does not cover the nodes 103, 105, 109. That is, the nodes 107, 111, 113 can separately establish a link with the apparatus 115 for communication. When the apparatus 115 intends to join the wireless network 1, a network entry process is executed so that the apparatus 115 can join the wireless network 1 smoothly. After the network entry process is executed completely, the apparatus 115 logs into the base station 101. Next, the apparatus 115 performs a link establishment process to establish links between the apparatus 15 and the nodes 107, 111, 113 covered by the effective connection range 100. After the apparatus 15 establishes links with the nodes 107, 111, 113, the apparatus 115 can use resources and channels of the wireless network 1 to communicate with the neighboring nodes 107, 111, 113. In other words, the link must be established before data can be transmitted. When the apparatus 115, a starting node, separately establishes links with nodes 107, 111, 113, receiving nodes, there are three required steps to ensure the links to be established correctly. Messages transmitted in these three-step procedures all comprise Neighbor Link Establishment information elements (IEs). The Messages can be called Neighbor Link Establishment messages, which can be divided as a challenge message, a challenge response message, and an accept message.

Taking the link established between the apparatus 115 and the node 107 as an example, the apparatus 115 transmits a challenge message 102 to the node 107 first. After the node 107 receives the challenge message 102, an authentication procedure is performed to confirm that the node 107 is allowed to establish a link with the apparatus 115. After the authentication procedure is passed, the node 107 transmits a challenge response message 108 to the apparatus 115 to establish a unidirectional link from the node 107 to the apparatus 115. After the apparatus 115 receives the challenge response message 108, the authentication procedure is also performed to confirm that the apparatus 115 is allowed to establish a link with the node 107. After the authentication procedure is passed, the apparatus 115 transmits an accept message 114 to the node 107 to establish a unidirectional link from the apparatus 115 to the node 107.

Based on the current IEEE 802.16 standard, the apparatus 115 can only establish a bidirectional link with one node at a time. As shown in FIG. 1, after the apparatus 115 establishes the link with the node 107, the apparatus 115 can establish bidirectional links with the node 111 and the node 113 one by one based on the aforementioned three-step procedure. That is, the apparatus 115 separately transmits challenge messages 104, 106 to nodes 111, 113. The nodes 111, 113 separately transmit challenge response messages 110, 112 to the apparatus 115 to establish unidirectional links 119, 121. Finally, the apparatus 115 separately transmits accept messages 116, 118 to nodes 111, 113 to establish unidirectional links 125, 127.

Consequently, the apparatus 115 and nodes 107, 111, 113 can establish bidirectional links through the aforementioned series of link establishment operations. Then, the apparatus 115 can transmit data with the nodes 107, 111, 113 via the links. The aforementioned messages related to link establishment, such as the challenge messages 102, 104, 106, the challenge response messages 108, 110, 112, and the accept messages 114, 116, 118, are transmitted through mesh network configuration message (MSH-NCFG).

In IEEE 802.16 standard, a challenge message comprises a Neighbor Link Establishment information element with an action code field set to 0, a reserve field, and a neighborhood authentication value field. The challenge response message comprises a Neighbor Link Establishment information element with an action code field set to 1, a reserve field, a neighborhood authentication value field, and a Link ID. The accept message comprises a Neighbor Link Establishment information element with an action code field set to 2, a reserve field, and a Link ID.

Since the authentication procedure will not be performed after the accept messages 114, 116, 118 are transmitted, the accept messages 114, 116, 118 do not confirm the fields in the starting node and the receiving node. Such a process causes that the apparatus 115 only can establish a bidirectional link with one node at a time. That is, the apparatus 115 is allowed to establish the link with one of the nodes 111, 113 only when the bidirectional link with the node 107 is established. This causes that the link establishment process monopolizes resources. In other words, before the apparatus 115 completes the aforementioned three-step procedure for establishing the bidirectional link with one node, other nodes can not proceed to establish their links. If nodes establish links simultaneously, it is possible to cause a deadlock condition during the link establishing process among a group of nodes, and thus it is unable to build any links in the wireless network with the mesh mode.

If the apparatus 115 establishes links with the nodes 107, 111, 113 simultaneously, the nodes 107, 111, 113 can not distinguish that the link ID in the accept message is for which one of the nodes 107, 111, 113 because the accept message only comprises the link ID but does not comprise the neighborhood authentication value field. As a result, the apparatus 115 confuses the nodes 107, 111, 113, and the wireless network 1 operating in the mesh mode of IEEE 802.16 will collapse.

Since the apparatus 115 only can establish a link with one of nodes covered by the effective connection range 100 at a time, the time for establishing links with all nodes will be long, especially when the number of nodes covered by the effective connection range 100 increases. Furthermore, the link establishing process monopolizes resources. If nodes establish links simultaneously, the deadlock condition may occur. Consequently, how to make the apparatus 115 establish links with all nodes covered by the effective connection range 100 simultaneously to reduce the establishing time and to avoid the deadlock condition is still a problem for the industry to solve.

SUMMARY OF THE INVENTION

One objective of this invention is to provide a method for an apparatus to simultaneously establish links with a plurality of nodes in a wireless network. The method comprises the following steps: determining whether a mesh network configuration message of the apparatus has space to packet an information element; determining whether a Neighbor Link Establishment information element needs to be transmitted to one of the nodes; packeting the Neighbor Link Establishment information element into the mesh network configuration message if the mesh network configuration message has space to packet an information element, and the Neighbor Link Establishment information element needs to be transmitted to one of the nodes; and transmitting the mesh network configuration message.

A further objective of the invention is to provide a computer readable medium storing a computer program for an apparatus to execute a method for simultaneously establishing links with a plurality of nodes in a wireless network. The method comprises the following steps: determining whether a mesh network configuration message of the apparatus has space to packet an information element; determining whether a Neighbor Link Establishment information element needs to be transmitted to one of the nodes; packeting the Neighbor Link Establishment information element into the mesh network configuration message if the mesh network configuration message has space to packet an information element, and the Neighbor Link Establishment information element needs to be transmitted to one of the nodes; and transmitting the mesh network configuration message.

Yet a further objective of the invention is to provide an apparatus capable of simultaneously establishing links with a plurality of nodes in a wireless network. The network nodes comprise a processor and a transmission module. The processor determines whether a mesh network configuration message of the apparatus has space to packet an information element, determines whether the apparatus needs to transmit a Neighbor Link Establishment information element to one of the nodes, and packets the Neighbor Link Establishment information element into the mesh network configuration message if the mesh network configuration message has space to packet an information element and the apparatus needs to transmit the Neighbor Link Establishment information element to one of the nodes. The transmission module transmits the mesh network configuration message.

The present invention is capable of packeting the information elements transmitted to each of the nodes into one mesh network configuration message and adding corresponding identification into the Neighbor Link Establishment information element for each node. Therefore, the drawbacks of the prior art that establishing links take time and might cause deadlock can be solved. The present invention can enhance the overall performance, deployment, and usability under a mesh mode network of IEEE 802.16, especially when there are a larger number of nodes needing to establish links.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
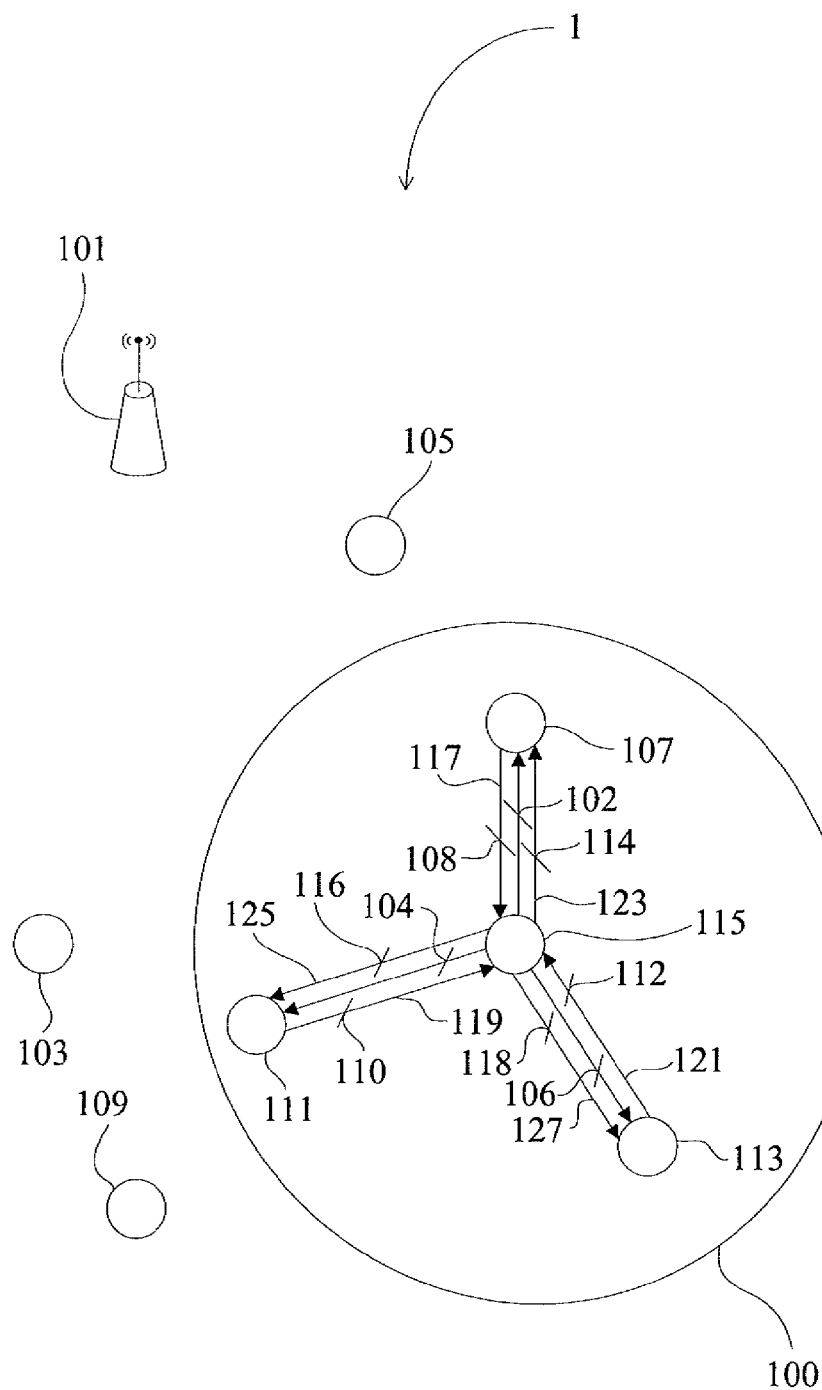
FIG. 1 is a schematic diagram illustrating a conventional wireless network in a mesh mode of IEEE 802.16.
Figure 2:
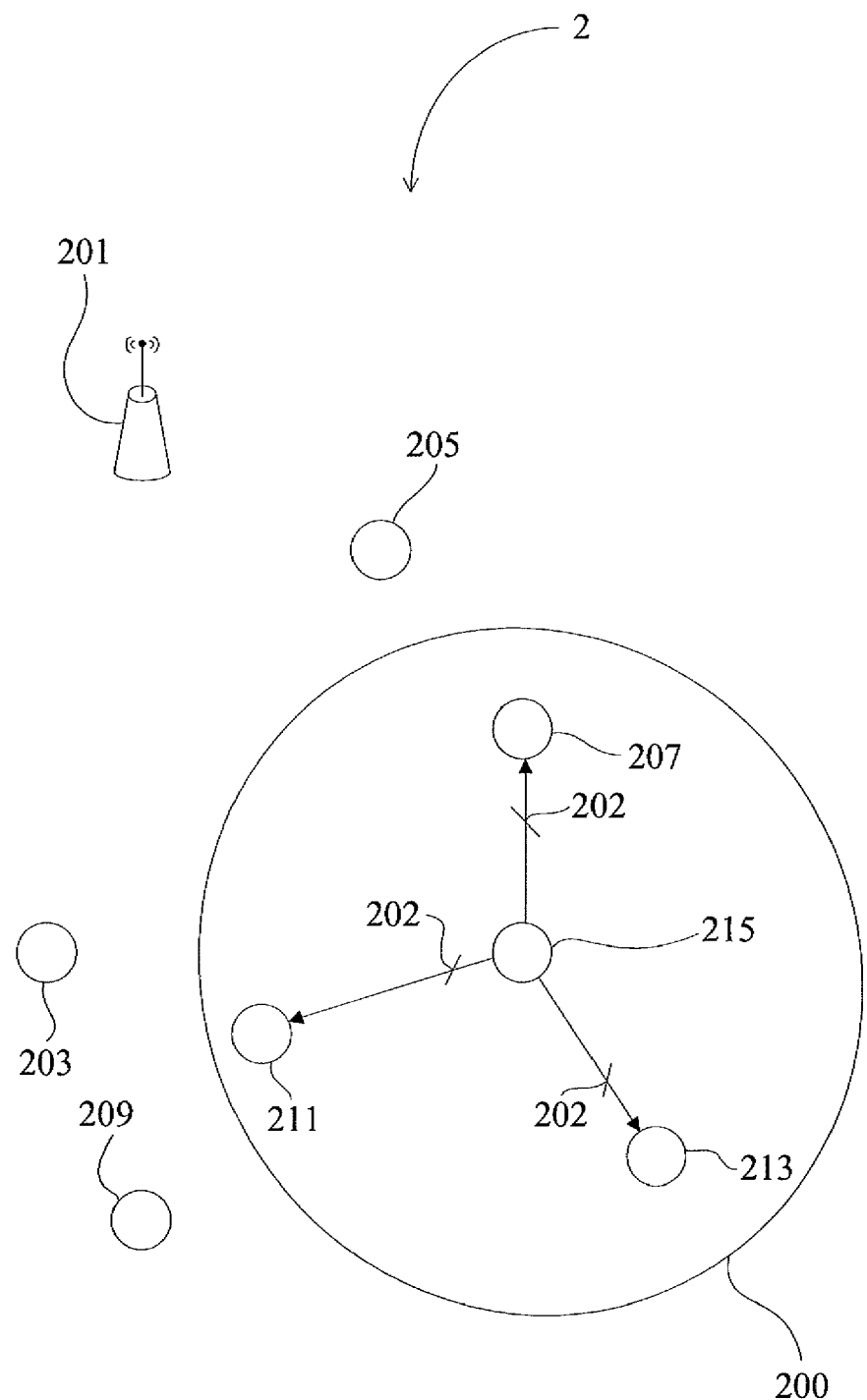
FIG. 2 is a schematic diagram illustrating a wireless network of a first embodiment of the present invention.
Figure 3:
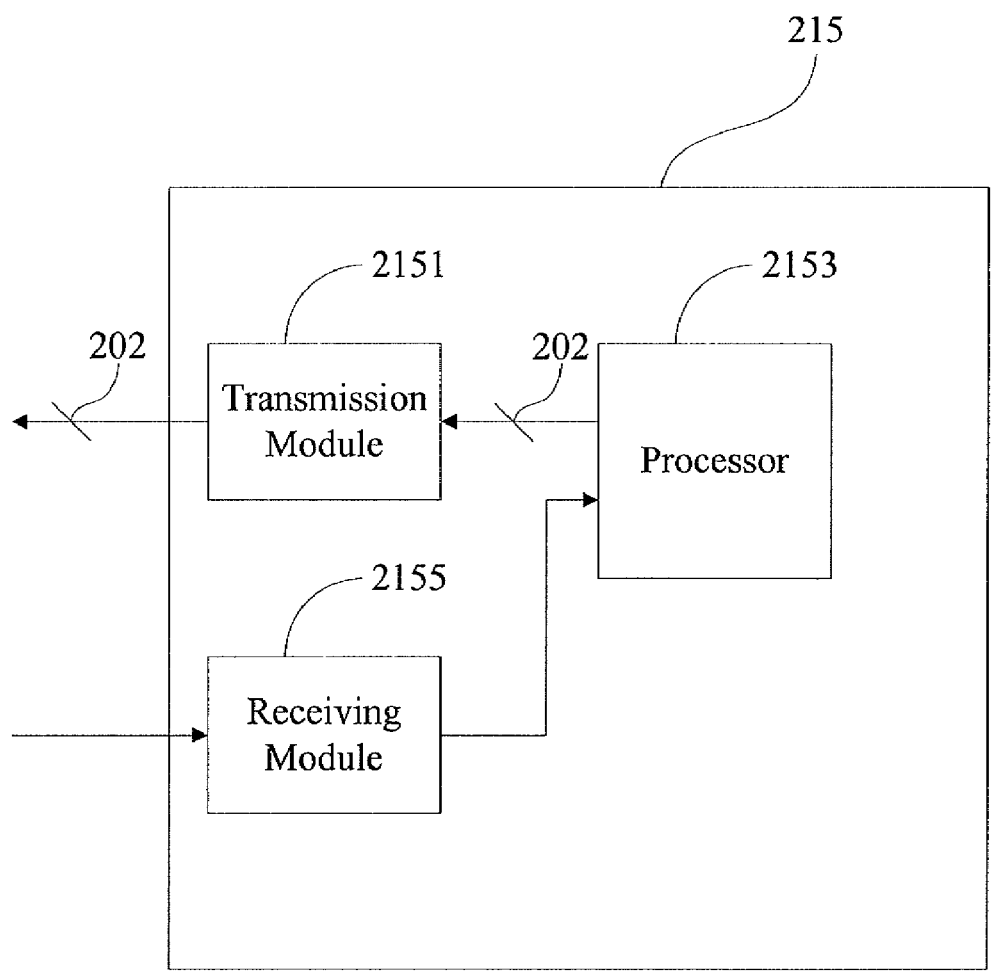
FIG. 3 is a schematic diagram of an apparatus of the first embodiment of the present invention.

As shown in FIG. 2, a first embodiment of the present invention is a wireless network 2 in a mesh mode of IEEE 802.16. The wireless network 2 comprises a base station 201, a plurality of nodes 203, 205, . . . , 213, and an apparatus 215 which just finishes a network entry process. As shown in FIG. 3, the apparatus 215 comprises a transmission module 2151, a processor 2153, and a receiving module 2155. The nodes 203, 205, . . . , 213, and the apparatus 215 can be a gateway, a router, or a terminal apparatus that transmit data in the mesh mode of IEEE 802.16.

The apparatus 215 has an effective connection range 200 which covers the nodes 207, 211, 213 and does not cover the nodes 203, 205, 209. After the apparatus 215 completes the network entry process and joins the wireless network 2, the apparatus 215 starts to perform a link establishing process with the nodes 207, 211, 213.

The apparatus 215 initially uses a mesh network configuration message 202 to transmit various Neighbor Link Establishment information elements, such as a challenge message, a challenge response message, or an accept message, to the nodes 207, 211, 213. The formats of these messages are defined by IEEE 802.16 standard, and thus no unnecessary detail is given here. Before the apparatus 215 transmits the mesh network configuration message 202, the processor 2153 determines whether the mesh network configuration message 202 has space to packet an information element. If yes, the processor 2153 continues to determine whether the apparatus 215 needs to transmit a Neighbor Link Establishment information element to one of the nodes 207, 211, 213. If the apparatus 215 needs to transmit a Neighbor Link Establishment information element to one of the nodes 207, 211, 213, that means the apparatus 215 does not establish the links with the nodes 207, 211, 213 yet. The processor 2153 then packets the Neighbor Link Establishment information element into the mesh network configuration message 202. The Neighbor Link Establishment information element is transmitted to the nodes 207, 211, 213 via the mesh network configuration message 202. If there is no space for the mesh network configuration message 202 to packet the Neighbor Link Establishment information element, the transmission module 2151 will transmit the mesh network configuration message 202 directly. If the processor 2153 determines that the apparatus 215 does not need to transmit a Neighbor Link Establishment information element to one of the nodes 207, 211, 213, that means the apparatus 215 and the nodes 207, 211, 213 have established links already. Under such circumstances, the transmission module 2151 may transmit other mesh network configuration messages 202. The receiving module 2155 is configured to receive returned data transmitted by the nodes 207, 211, 213 covered in the effective connection range 200.

The above-mentioned operations will be further recited in the following descriptions. When the processor 2153 determines that the mesh network configuration message 202 still has space to packet the an information element, and the apparatus 215 has to transmit a challenge message to the node 207, the processor 2153 will packet the challenge message for the node 207 into the mesh network configuration message 202. Next, if the processor 2153 continues to determine that the mesh network configuration message 202 still has space to packet one more Neighbor Link Establishment information element, and the apparatus 215 has to transmit an accept message to the node 213, the processor 2153 will packet the accept message for the node 213 into the mesh network configuration message 202. After that, if the mesh network configuration message 202 has no more space to packet any information element or the apparatus 215 has no Neighbor Link Establishment information element required to be transmitted to the nodes 207, 211, 213, the transmission module 2151 will transmit the mesh network configuration message 202.

Since the mesh network configuration message 202 is transmitted by broadcasting, the nodes 207, 211, 213 covered in the effective connection range 200 can receive the mesh network configuration message 202. No matter the packeted information element in the mesh network configuration message 202 is the challenge message for the node 207, the accept message for the node 213, or other messages with Neighbor Link Establishment information elements, the Neighbor Link Establishment information elements packeted into the mesh network configuration message 202 comprise the identification of the apparatus 215 and the identifications of the destination nodes. For example, the challenge message for the node 207 comprises the identification of the apparatus 215 and the identification of the node 207, the accept message for the node 213 comprises the identification of the apparatus 215 and the identification of the node 213. This allows the nodes 207, 211, 213 to find out which Neighbor Link Establishment information element is for itself, and to ignore other Neighbor Link Establishment information elements for other nodes.

A second embodiment of the present invention is a method for an apparatus to simultaneously establish links with a plurality of nodes in a wireless network. The method is applied to the apparatus 215 described in the first embodiment. The method of the second embodiment can be performed by a computer program which is stored in a computer readable medium.

Figure 4:
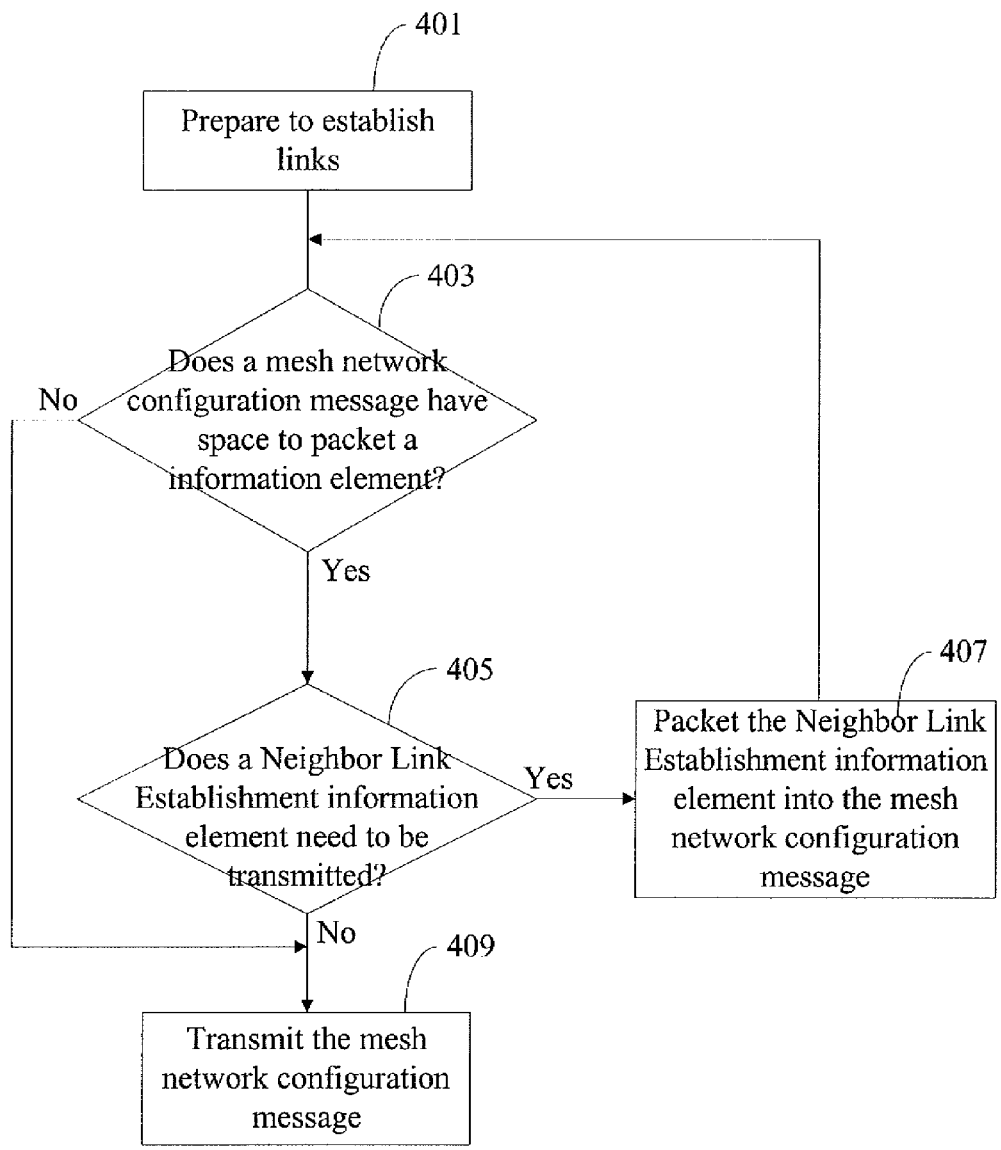
FIG. 4 is a flow chart of a second and a third embodiment of the present invention.

As shown in FIG. 4, the method begins at step 401 in which the computer program comprises code for the apparatus 215 preparing to establish links. Step 403 is then executed in which the computer program comprises code for the processor 2153 determining whether a mesh network configuration message of the apparatus 215 has space to packet an information element. If yes, step 405 is executed in which the computer program comprises code for the processor 2153 continuing to determine whether a Neighbor Link Establishment information element needs to be transmitted to one of the nodes. If the apparatus 215 needs to transmit a Neighbor Link Establishment information element to one of the nodes, step 407 is executed in which the computer program comprises code for the processor 2153 packeting the Neighbor Link Establishment information element into the mesh network configuration message. After step 407 is executed, step 403 is executed again in which the processor 2153 determines whether a mesh network configuration message of the apparatus 215 has space to packet another information element.

If there is no space for the mesh network configuration message to packet an information element in step 403, step 409 is executed in which the computer program comprises code for a transmission module 2151 transmitting the mesh network configuration message. Furthermore, if the processor 2153 determines that the apparatus 215 does not need to transmit a Neighbor Link Establishment information element to one of the nodes in step 405, step 409 is also executed.

In the above steps, step 403 and step 405 do not have to be executed in the fixed sequence. Although, the second embodiment illustrates that step 403 is executed first and step 405 is executed later, step 403 and step 405 can be interchanged such that after step 405 is executed, step 403 continues to be executed if yes in step 405. In other embodiments, step 403 and step 405 can be executed together. That is, when the mesh network configuration message of the apparatus 215 is determined to have space to packet an information element and there is a Neighbor Link Establishment information element required to be transmitted, step 407 is executed.

In addition to the steps shown in FIG. 4, the computer program of the second embodiment also has further code to execute all of the operations or functions recited in the first embodiment. Those skilled in this field can straightforwardly realize how the second embodiment performs these operations and functions based on the above descriptions of the first embodiment, and thus no unnecessary detail is given here.

A third embodiment of the invention is another method for an apparatus to simultaneously establish links with a plurality of nodes in a wireless network. For a more detailed description, the method of the third embodiment is similar to the method of the second embodiment.

At first, step 401 is executed for preparing to establish links. Step 403 is executed for determining whether a mesh network configuration message has space to packet an information element. If yes, step 405 is executed for determining whether a Neighbor Link Establishment information element needs to be transmitted to one of the nodes. If the Neighbor Link Establishment information element needs to be transmitted to one of the nodes, step 407 is executed for packeting the Neighbor Link Establishment information element into the mesh network configuration message. After step 407 is executed, step 403 is executed again for determining whether a mesh network configuration message has space to packet another information element.

If there is no space for the mesh network configuration message to packet an information element in step 403, step 409 is executed for transmitting the mesh network configuration message. Furthermore, if there is no need to transmit the Neighbor Link Establishment information element to one of the nodes in step 405, step 409 is also executed.

Similar to the second embodiment, step 403 and step 405 do not have to be executed in an absolute order. Those skilled in the art can straightforwardly realize the corresponding steps or operations of the third embodiment according to the descriptions of the second embodiment, and thus no necessary detail is given here.

In addition to the steps shown in FIG. 4, the computer program of the third embodiment can has code to execute all of the operations or functions recited in the first embodiment. Those skilled in this field can straightforwardly realize how the third embodiment performs these operations and functions based on the above descriptions of the first embodiment, and thus no unnecessary detail is given here.

The above-mentioned computer readable medium can be a floppy disk, a hard disk, an optical disc, a flash disk, a tape, a database accessible from a network or a storage medium with the same functionality that can be easily thought by people skilled in the art.

Accordingly, the present invention can packet the Neighbor Link Establishment information elements that have to be transmitted to nodes into a mesh network configuration message and add the identification of the apparatus and the identification of the nodes into the Neighbor Link Establishment information element so that the nodes can find out the required Neighbor Link Establishment information element in the mesh network configuration message. With peroforming the aforementioned method by slightly amending IEEE 802.16 specification, the required time for establishing links among all nodes covered with the effective connection range of the apparatus can be reduced successfully. Furthermore, the deadlock conditions, when links between nodes and the apparatus are established, can be avoided so that when the apparatus requests to enter the mesh network of IEEE 802.16, the user will never fall into a painful waiting or an awkward situation of not being able to connecting to the base stations. Users can obtain an unprecedented use experience in easily add their apparatuses, such as laptops or various kinds of mobile electronic apparatuses, to the mesh network of IEEE 802.16. The capability of easily connecting to the network to obtain the required information in the future city is of great news for users.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for an apparatus to establish links with a plurality of nodes in a wireless network, comprising the steps of:
   determining whether a mesh network configuration message (MSH-NCFG) of the apparatus has space to packet an information element (IE), wherein the mesh network configuration message has packeted a first Neighbor Link Establishment information element for a first node of the nodes, and the first node is in an effective connection range of the apparatus;
   determining whether a second Neighbor Link Establishment information element needs to be transmitted to a second node of the nodes, wherein the second node is in the connection range of the apparatus;
   packeting the second Neighbor Link Establishment information element into the mesh network configuration message if the mesh network configuration message has space to packet an information element, and the second Neighbor Link Establishment information element needs to be transmitted to the second node of the nodes; and
   transmitting the mesh network configuration message to the first node and the second node by broadcasting;
   whereby the apparatus establishes the links with the first node and the second node simultaneously.

2. The method of claim 1, wherein the first Neighbor Link Establishment information element is one of a challenge message, a challenge response message, and an accept message, and the second Neighbor Link Establishment information element is one of a challenge message, a challenge response message, and an accept message.

3. The method of claim 2, wherein when the first Neighbor Link Establishment information element comprises an identification (ID) of the apparatus, an identification of the first node and an identification of the second node.

4. A non-transitory computer readable medium storing a computer program for an apparatus to execute a method for establishing links with a plurality of nodes in a wireless network, the method comprising the steps of:
   determining whether a mesh network configuration message of the apparatus has space to packet an information element, wherein the mesh network configuration message has packeted a first Neighbor Link Establishment information element for a first node of the nodes, and the first node is in an effective connection range of the apparatus;
   determining whether a second Neighbor Link Establishment information element needs to be transmitted to a second node of the nodes, wherein the second node is in the connection range of the apparatus;
   packeting the second Neighbor Link Establishment information element into the mesh network configuration message if the mesh network configuration message has space to packet an information element and the second Neighbor Link Establishment information element needs to be transmitted to the second node of the nodes; and
   transmitting the mesh network configuration message to the first node and the second node by broadcasting;

whereby the apparatus establishes the links with the first node and the second node simultaneously.

5. The computer readable medium of claim 4, wherein the first Neighbor Link Establishment information element is one of a challenge message, a challenge response message, and an accept message, and the second Neighbor Link Establishment information element is one of a challenge message, a challenge response message, and an accept message.

6. The computer readable medium of claim 5, wherein when the Neighbor Link Establishment information element comprises an identification of the apparatus, an identification of the first node, and an identification of the second node.

7. An apparatus capable of establishing links with a plurality of nodes in a wireless network, comprising:
a processor for determining whether a mesh network configuration message of the apparatus has space to packet an information element, wherein the mesh network configuration message has packeted a first Neighbor Link Establishment information element for a first node of the nodes, and the first node is in an effective connection range of the apparatus, and determining whether the apparatus needs to transmit a second Neighbor Link Establishment information element to a second node of the nodes, wherein the second node is in the connection range of the apparatus, and for packeting the second Neighbor Link Establishment information element into the mesh network configuration message if the mesh network configuration message has space to packet an information element and the apparatus needs to transmit the second Neighbor Link Establishment information element to second of the nodes; and
a transmission module for transmitting the mesh network configuration message to the first node and the second node by broadcasting;
whereby the apparatus establishes the links with the first node and the second node simultaneously.

8. The apparatus of claim 7, wherein the first Neighbor Link Establishment information element is one of a challenge message, a challenge response message, and an accept message, and the second Neighbor Link Establishment information element is one of a challenge message, a challenge response message, and an accept message.

9. The apparatus of claim 8, wherein when the Neighbor Link Establishment information element comprises an identification of the apparatus, an identification of the first node, and an identification of the second node.

* * * * *